UNITED STATES PATENT OFFICE 2,631,989

COMPOSITIONS COMPRISING AN ACRYLONITRILE POLYMERIZATION PRODUCT AND A DIOXANONE

John J. Padbury, Springdale, Conn., assignor to American Cyanamid Company, New York, N. Y., a corporation of Maine No Drawing. Application February 8, 1952, Serial No. 270,757

9 Claims. (Cl. 260—30.4)

This invention relates to new and useful compositions of matter and more particularly to compositions comprising an acrylonitrile polymerization product and a dioxanone, more particularly 2-p-dioxanone which has the formula

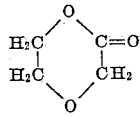

The compositions of this invention in which the aforementioned dioxanone is employed primarily as a solvent for the acrylonitrile polymerization product, in which case it constitutes a major proportion (more than 50%), e. g., from 55 to 95% or more, by weight of the composition, are particularly useful in the production of shaped articles therefrom, e. g., films, filaments, threads, rods, tubes and the like. The compound 2-p-dioxanone also may be used primarily as a plasticizer for an acrylonitrile polymerization product, in which case it usually constitutes a minor proportion (less than 50%), e. g., from 0.5 to 45%, generally from 1 to 35 or 40% by weight of the composition.

Various methods of producing filaments, films and other shaped articles from polyacrylonitrile (polymeric acrylonitrile) and from copolymers or interpolymers of a major proportion of acrylonitrile and a minor proportion of another monomer or monomers, e. g., a polymerization product containing in the polymer molecules an average of at least 85% by weight of combined acrylonitrile, heretofore have been suggested. For example, in Rein U. S. Patent No. 2,117,210 it is proposed that polyacrylonitrile be dissolved in a quaternary ammonium compound, more particularly a pyridinium compound such as benzyl pyridinium chloride, and that the resulting solution be employed in making films, threads and other shaped bodies therefrom. Also, in Rein U. S. Patent No. 2,140,921 it is proposed that various polyvinyl compounds including polyacrylonitrile and copolymers of acrylonitrile with another vinyl compound be dissolved in concentrated aqueous solutions of inorganic (metal) salts, e. g., the chlorides, bromides, iodides, thiocyanates, perchlorates and nitrates, and that the resulting solutions be used in the manufacture of threads, films, etc.

The present invention is based on my discovery that polymers and copolymers of acrylonitrile, more particularly polymeric acrylonitrile and thermoplastic copolymers of acrylonitrile, specifically such copolymers containing in their molecules an average of at least 80% by weight of combined acrylonitrile, e. g., copolymers of, by weight, from 80 to 99.5% of acrylonitrile and another monomer such, for instance, as vinyl acetate, methyl acrylate, ethyl acrylate, acrylamide, etc., are compatible with 2-p-dioxanone and that this dioxanone is capable of dissolving the acrylonitrile polymerization product to yield solutions which are suitable for use in making mono- and multifilaments, threads, yarns, bars, films, etc., therefrom. The invention is based on my further discovery that the aforementioned dioxanone is able effectively to plasticize acrylonitrile polymerization products, so that the latter more easily can be shaped, as by extrusion or molding, into useful articles of manufacture. The 2-p-dioxanone employed in practicing my invention may be used either as a fugitive or temporary plasticizer, that is, a plasticizer which subsequently is removed from the polymerization product, or as a permanent plasticizer which is permitted to remain in the shaped polymer or copolymer.

2-p-dioxanone is a known compound and is prepared, for example, by dehydrogenating diethylene glycol with the aid of a suitable catalyst. It has a melting point of about 27° C. and a boiling point of about 212°–214° C. at atmospheric pressure. 2-p-dioxanone is soluble in water at 70° C., yielding a clear solution. It is soluble at room temperature in glycerol, acetone, cyclohexanone, dioxane, acetonitrile and the monomethyl ether of ethylene glycol. It does not cause decomposition of, nor appear to react chemically with, an acrylonitrile polymerization product. Furthermore, it can be partially or substantially completely removed from films, threads, or other shaped bodies which are produced from a solution of polymeric or copolymeric acrylonitrile in the said dioxanone.

Polymeric acrylonitrile and acrylonitrile copolymers (thermoplastic acrylonitrile copolymers) containing in the polymer molecules an average of at least 80% by weight of combined acrylonitrile are employed in carrying the present invention into effect. These polymers and copolymers are prepared by methods now well known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted, in practicing the present invention, so that the final copolymer contains in the molecules thereof an average of at least 80% by weight of combined acrylonitrile. The expression "polymerization product containing in the polymer molecules an average of at least 80% by weight of combined acrylonitrile," as used herein and in the appended claims, means a polymerization product (polymer, copolymer or interpolymer or mixtures thereof) containing in their molecules an average of at least 80% by weight of the acrylonitrile unit, which is considered to be present in the individual polymer molecule as the group

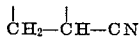

or, otherwise stated, at least 80% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 80% by weight of combined acrylonitrile are compounds containing a single $CH_2=C<$ grouping, for instance, the vinyl esters and especially the vinyl esters of saturated aliphatic monocarboxylic acids, e. g., vinyl acetate, vinyl propionate, vinyl butyrate, etc.; vinyl and vinylidene halides, e. g., the vinyl and vinylidene chlorides, bromides and fluorides; allyl-type alcohols, e. g., allyl alcohol, methallyl alcohol, methallyl alcohol, ethallyl alcohol, etc.; allyl, methallyl and other unsaturated monohydric alcohol esters of monobasic acids, e. g., allyl and methallyl acetates, laurates, cyanides, etc.; acrylic and alkacrylic acids (e. g., methacrylic, ethacrylic, etc.) and esters and amides of such acids (e. g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbon-substituted acrylonitriles; unsaturated aliphatic hydrocarbons containing a single $CH_2=C<$ grouping, e. g., isobutylene, etc.; and numerous other vinyl, acrylic and other compounds containing a single $CH_2=C<$ grouping which are copolymerizable with acrylonitrile to yield thermoplastic copolymers. Alkyl esters of alpha, beta-unsaturated polycarboxylic acids also may be copolymerized with acrylonitrile to form copolymers which are useful in practicing the present invention, e. g., the dimethyl, -ethyl, -propyl, -butyl, etc., esters of maleic, fumaric, citraconic, etc., acids.

The proportions of monomers in the polymerizable mixture may be varied as desired or as may be required in order to obtain a polymerization product containing in the polymer molecules an average of at least 80% by weight of combined acrylonitrile. Thus, when the polymerization rate of the monomers present in the polymerizable mixture is substantially the same, the proportions may be, for example, from, by weight, about 80% to about 99% of acrylonitrile to from about 20% to about 1% of the other comonomer. When the polymerizable mixture contains, in addition to the acrylonitrile, a monomer such, for example, as vinyl chloride, allyl alcohol, etc., which polymerizes at a rate different from that of acrylonitrile, then it may be necessary to subject to polymerization conditions a mixture in which the acrylonitrile constitutes as little as, for instance, 50 or 60% by weight thereof in order to obtain a polymerization product containing in the copolymer molecules an average of at least 80% by weight of acrylonitrile.

Any suitable method of polymerizing the monomeric acrylonitrile or mixture of monomers may be employed. One suitable method comprises polymerizing the monomer or mixture of monomers in an aqueous emulsion using a suitable polymerization catalyst, e. g., ammonium persulfate. Other polymerization methods, however, also may be used, e. g., methods such as those described in Bauer et al. U. S. Patent No. 2,160,054, Jacobson U. S. Patent No. 2,436,926, and others. The polymeric and copolymeric acrylonitriles used in practicing my invention may be of any suitable molecular weight, but ordinarily the molecular weight (average molecular weight) is within the range of 15,000 to 300,000 or higher, and advantageously is of the order of 35,000 or 40,000 to 140,000 or 150,000, e. g., about 70,000–75 000, as calculated from viscosity measurements using the Staudinger equation (reference: U. S. Patent No. 2,404,713).

The dissolution of the acrylonitrile polymerization product in the 2-p-dioxanone is accelerated by using a polymer or copolymer which is in finely divided state, e. g., one which, if not in finely divided state as originally formed, has been ground so that all or substantially all of it will pass through a U. S. Standard Sieve Series No. 50 screen. It also is usually desirable to agitate the mass, as by mechanical stirring, while dissolving the polymerization product in the solvent. To avoid or minimize discoloration of the polymeric or copolymeric acrylonitrile, it is generally advantageous to employ the lowest possible temperature in effecting dissolution or plasticization of the acrylonitrile polymerization product, which temperature is consistent with practical considerations, e. g., the time required for effecting solution, etc.

The proportions of the acrylonitrile polymerization product and 2-p-dioxanone in the compositions of my invention may be varied widely, depending mainly upon the particular use for which the composition is intended. If the dioxanone is employed primarily as a solvent for the polymer or copolymer so as to obtain a film, filament, thread, yarn, rod, tube or other shaped article from which all or substantially all of the solvent subsequently is removed, then the acrylonitrile polymerization product usually constitutes at least 4 or 5% but less than 50%, e. g., from 5 to about 20 or 25%, by weight of the composition. If the solution is to be used in the spinning of filaments (mono- or multifilaments) or the casting of films, it is generally preferred that the polymer or copolymer constitute at least 7 or 8%, e. g., from 10 to 15 or 20%, by weight of the composition. The aforementioned ranges of proportions are mentioned as indicative of proportions that may be employed in forming solutions of the polymerization product, and my invention obviously is not limited to the use of only such proportions. Especially in spinning and casting applications of the compositions, the important factor is that the proportions be such that the viscosity of the composition at the operating temperature is within a workable range. Satisfactory viscosities are the usual operating temperatures generally prevail when the polymer or copolymer constitutes between about 5% and about 15% by weight of the composition, but this also is dependent upon the average molecular weight of the polymerization product which may range, for example, from 15,000 or 20,000 up to 150,000 or 200,000, or even as high as 250,000 or 300,000 or more, as determined from viscosity measurements and calculations by the Staudinger equation.

Because the use of the higher amounts of solvent renders spinning operations more costly and difficult due to the trouble often encountered in rapidly removing large amounts of solvent from the solution and due to the cost of such removal, even though the solvent be recovered, it is preferable to use a polymerization product having a molecular weight such that a maximum amount of the polymer or copolymer, consistent with the viscosity of the solution at the operating temperature, can be dissolved in the 2-p-dioxanone. By using acrylonitrile polymerization products having an average molecular weight (Staudinger method) within the range of 35,000 or 40,000 up to 150,000 or 160,000, it is possible to obtain solutions containing, for instance, from 5 to 15% or more by weight thereof of the polymer or copolymer, and having suitable viscosities for use at operating temperatures of the order of, for example, 70° C. to 150° C.

The solutions described above may be used in the production of various fabricated structures such, for example, as films, filaments, bars, rods, tubes, etc., in accordance with general techniques and using apparatus now generally known to those skilled in the art, the detailed operating conditions being suitably modified where required.

In one method of making extruded articles such, for example, as filaments, etc., the solution (advantageously heated to, for instance, 70° C. to 150° C.) is extruded through a spinneret or die into a liquid coagulating bath which will coagulate the polymerization product in the spinning solution. The liquid into which the spinning solution is extruded is one which is miscible with 2-p-dioxanone and which, as a result of extracting the solvent, is capable of coagulating the polymerization product. Any liquid which is thus capable of coagulating the polymer or copolymer may be employed, but preferably the liquid coagulant is one which has no harmful effect upon the polymerization product. Examples of liquid coagulants that can be used when warm (e. g., 65° C.) are glycerol, cyclohexanone, dioxane, acetonitrile, ethylene glycol monomethyl ether and others. Dioxane and acetonitrile at room temperature also can be used as coagulants. Water heated to 70°–99.5° C. likewise is suitable for use in coagulating the acrylonitrile homopolymer or copolymer from its solution in 2-p-dioxanone.

It will be understood, of course, by those skilled in the art that the temperature of the liquid coagulating or precipitating bath should be such as to dissolve the solvent from the extruded mass most rapidly and effectively. The length of travel of the shaped article through the bath may be varied as desired or as conditions may require, but in all cases should be sufficiently long to effect solidification of the polymerization product and to extract from the extruded mass all of the solvent, or, if desired, only a part of it, leaving the remainder, e. g., from 0.5 or 1% to 15 or 20% or more, by weight of the whole, in the extruded mass so that it may function as a plasticizer for the polymerization product. One or more sheaves or rolls may be positioned in the bath so as to guide the filament during its formation and to keep it under tension thereafter.

The spun filament or other extruded article is preferably treated in, or after leaving, the coagulating bath in order to orient the molecules and thereby to increase the tensile strength and otherwise to improve the properties of the spun material. Orientation may be effected by stretching the thread or strand at any suitable stage of the spinning operation, but preferably while the spun filament or thread still contains at least some of the solvent. Stretching may be accomplished by passing the thread or yarn between two or more positively driven rollers or godets, the peripheral speeds of which are adjusted so that the thread is stretched to the desired degree.

The amount of stretch that is applied to the filament or strand may be varied widely, but in all cases should be sufficient to cause at least appreciable orientation of the molecules and an improvement in the properties of the material undergoing treatment. The amount of tension to which the strand is subjected obviously should not be so great as to cause it to break. Depending, for example, upon the type or kind of material being stretched and the particular properties desired in the finished product, the amount of stretch may vary, for instance, from 100%, preferably from 200 or 300%, up to 1000% or more of the original length of the filament or strand. The stretch may be applied gradually by passing the thread over a plurality of godets having increasing peripheral speeds. The stretched thread may be wound upon a spool or it may be collected in a centrifugal pot, whereby twist advantageously is applied to the thread. Alternatively, the stretched thread may be led over a thread-storage device on which it may be treated with a suitable solvent to remove all or part of the coagulant and/or 2-p-dioxanone, after which it may be continuously dried, oiled and taken up on a twisting device such, for instance, as a ring twisting spindle.

The extruded filament or thread may be given part or all of its total stretch in a liquid medium such as that which constitutes the coagulating bath, or in any other suitable medium, and at a suitable temperature. Thus, the stretch may be applied while the strand is being passed through a gaseous medium, e. g., air, nitrogen, flue gases, etc., or through a liquid medium, e. g., water, or such media as are employed for coagulating the polymerization product. To obviate or minimize discoloration of the polymerization product, the temperature of the medium in which the polymer or copolymer is stretched and the rate of travel of the strand through the medium should be so adjusted that overheating of the strand does not occur. Ordinarily the temperature of the medium in which stretching is effected is below 200° C., e. g., at 70° to 140° C.

The highly stretched product is strong, tough and pliable, and shows a high degree of orientation along the fiber axis by X-ray diffraction.

The solvent solutions of the acrylonitrile polymerization product also can be cast in the form of films. For instance, the hot, liquid composition may be cast upon a revolving drum which is partly immersed in a coagulating bath, such as mentioned hereinbefore, and which will serve to deposit the polymerization product as a thin film on the drum as it passes through the bath. The resulting film may be stretched, if desired, lengthwise and crosswise by suitable apparatus to improve its properties.

As indicated hereinbefore, the spinning operation can be so conducted as to leave some of the 2-p-dioxanone in the polymerization product as a plasticizer therefor. Other means, however, also can be employed for plasticizing a polymer or copolymer of acrylonitrile with 2-p-dioxanone. For example, a water-swollen filament or thread of polymeric or copolymeric acrylonitrile which has been produced as described in, for instance, Cresswell Patents 2,558,730, -1 and -2, and Cresswell et al. Patent 2,558,733, can be treated, as by immersion, with the said dioxanone. Or, 2-p-dioxanone can be dissolved in a solvent, e. g., dioxane, acetonitrile, hot water and others such as previously have been mentioned, and this solution then can be used in treating the water-swollen, stretched or unstretched thread.

Compositions comprising, by weight, from about 5 or 10% to about 35 or 40% of 2-p-dioxanone and the remainder an acrylonitrile polymerization product containing in the molecules thereof an average of at least 80% by weight of combined acrylonitrile also may be employed as a dielectric or as a component of a dielectric in an electric capacitor, as is more fully described in the copending application of William C. Schneider, Serial No. 180,370, filed August 19, 1950, with particular reference to the use in electric capacitors of dielectrics comprising such an acrylonitrile polymerization product with a different plasticizer. The 2-p-dioxanone-plasticized acrylonitrile polymerization product also can be combined with paper, fabrics comprising fibers of an acrylonitrile polymerization product, and other dielectrics of the kind and in the manner disclosed, for example, in the aforementioned Schneider application.

In order that those skilled in the art better may understand how the present invention can be carried into effect, the following examples are given by way of illustration and not by way of limitation. All parts are by weight.

Example 1

A mixture of 2 parts of finely divided homopolymeric acrylonitrile (ground so that all or substantially all of it will pass through a U. S. Standard Sieve Series No. 50 screen) and 18 parts of 2-p-dioxanone is heated with stirring in a reaction vessel placed over a low flame. The solution is clear when the temperature has been raised to 135° C., and remains clear upon cooling to room temperature (about 25° C.).

Example 2

Same as in Example 1 with the exception that, instead of 2 parts of homopolymeric acrylonitrile, there is used 2 parts of an acrylonitrile copolymer produced by polymerizing a mixture of 95 parts acrylonitrile and 5 parts methyl acrylate. The resulting solution is clear when the temperature has been raised to 135° C., and remains clear upon cooling to room temperature.

Example 3

Same as in Example 1 with the exception that, instead of 2 parts of homopolymeric acrylonitrile, there is used 2 parts of an acrylonitrile copolymer produced by polymerizing a mixture of 90 parts acrylonitrile and 10 parts acrylamide. The resulting solution is clear when the temperature has been raised to a little over 100° C., and remains clear upon cooling to room temperature.

Example 4

Same as in Example 1 with the exception that, instead of 2 parts of homopolymeric acrylonitrile, there is used 2 parts of an acrylonitrile copolymer produced by polymerizing a mixture of 95 parts acrylonitrile and 5 parts 2-methyl-5-vinyl pyridine. The resulting solution is clear when the temperature has been raised to a little over 100° C., and remains clear upon cooling to room temperature.

Example 5

Same as in Example 1 with the exception that, instead of 2 parts of homopolymeric acrylonitrile, there is used 2 parts of an acrylonitrile copolymer produced by polymerizing a mixture of 80 parts acrylonitrile and 20 parts vinyl acetate. The resulting solution is clear when the temperature has been raised to 135° C., and remains clear upon cooling to room temperature.

Example 6

Fifty (50) parts of 2-p-dioxanone and 200 parts of finely divided polyacrylonitrile (homopolymeric acrylonitrile) are blended together to yield a homogeneous composition by rolling in a ball mill for 30 hours. This composition can be molded into various shaped articles, e. g., disks, bars, etc., under heat and pressure, for instance at 150°–160° C. and under a pressure of from 4000 to 5500 pounds per square inch.

Example 7

A mixture of 5 parts of finely divided homopolymeric acrylonitrile and 95 parts of 2-p-dioxanone is heated to 135° C., yielding a clear spinning solution. This solution is filtered and deaerated under vacuum. The resulting solution heated to 80°–90° C. is extruded through a spinneret into a coagulating bath of water maintained at 90°–95° C., thereby to form a filament or thread of polymeric acrylonitrile. This filament is then stretched to cause orientation along the fiber axis in the manner hereinbefore described.

Example 8

A filament or fiber produced from 2-p-dioxanone and homopolymeric acrylonitrile in the manner described under Example 7 and which contains a small amount of the order of 3% of residual 2-p-dioxanone is stretched about 500% to orient the molecules along the fiber axis, yielding a plasticized oriented filament of polyacrylonitrile.

Example 9

Same as in Example 7 with the exception that the spinning solution contains 5 parts of an acrylonitrile-methyl acrylate copolymer, produced by copolymerization in aqueous solution of 95 parts acrylonitrile and 5 parts methyl acrylate, instead of 5 parts of homopolymeric acrylonitrile; and the hot solution is extruded into a coagulating bath of dioxane at room temperature instead of water maintained at 90°–95° C. Similar results are obtained.

Example 10

Example 9 is repeated, substituting acetonitrile at room temperature for the dioxane coagulating bath. Similar results are obtained.

It will be understood, of course, by those skilled in the art that my invention is not limited to the specific proportions of ingredients, operating conditions and procedures given in the above illustrative examples. Likewise, polymerization products other than those given in the examples may be used. For instance, instead of the particular copolymers of acrylonitrile and methyl acrylate, acrylonitrile and acrylamide, acrylonitrile and vinyl acetate, and acrylonitrile and 2-methyl-5-vinyl pyridine employed in the examples, I may use such copolymers in which the acrylonitrile is present in the copolymer molecules in other proportions within the range of, for example, an average of 80% to 99% or more by weight, or other copolymers of acrylonitrile and another monomer, numerous examples of which have been given hereinbefore, and in which the acrylonitrile constitutes at least 80% by weight of the copolymer molecule.

From the foregoing description it will be seen that the present invention provides compositions comprising an acrylonitrile polymerization product (polymer, copolymer or interpolymer) and 2-p-dioxanone either as a plasticizer or as a solvent therefor. Instead of using monomeric 2-p-dioxanone as a plasticizer for homopolymeric or copolymeric acrylonitrile, a linear polymer of 2-p-dioxanone may be used as a plasticizer for such acrylonitrile polymerization products.

Instead of using 2-p-dioxanone alone as a plasticizer or solvent for acrylonitrile polymerization products of the kind with which the present invention is concerned, one can use the said dioxanone in combination with other known solvents or plasticizers for a polymer or copolymer of acrylonitrile, and in any proportions. For instance, as a solvent for the aforementioned acrylonitrile polymerization product, one can use a concentrated aqueous solution containing a mixture of 2-p-dioxanone and a water-soluble inorganic salt (or plurality of such salts), more particularly such a salt or salts which yield highly hydrated ions in aqueous solution, e. g., the chlorides, bromides, thiocyanates, perchlorates and nitrates, which salts are disclosed, for example, in the aforementioned Rein Patent No. 2,140,921. More specific examples of such water-soluble inorganic salts are zinc chloride, calcium chloride, lithium bromide, cadmium bromide, cadmium iodide, sodium thiocyanate, zinc thiocyanate, aluminum perchlorate, calcium perchlorate, calcium nitrate, zinc nitrate, etc. Examples of other salts that can be employed in combination with 2-p-dioxanone in carrying the present invention into effect, more particularly in the form of an aqueous solution as a solvent for the hereindescribed polymers and copolymers of acrylonitrile, are guanidine thiocyanate, the mono-(lower alkyl)-substituted guanidine thiocyanates and the symmetrical and unsymmetrical di-(lower alkyl)-substituted guanidine thiocyanates, which salts are more fully described (including their use as solvents for acrylonitrile polymerization products) in Cresswell Patent No. 2,533,224 dated December 12, 1950. Such salts, of course, should not be used when the composition is to be employed as a dielectric.

The compositions of this invention can be shaped or fabricated, as by extrusion, molding, casting, etc., into a wide variety of useful articles. Lubricants, anti-static agents and other conventional modifiers of acrylonitrile polymerization products can be incorporated therein at any suitable stage of the operation. Other and more specific examples of modifiers that can be employed are given in, for example, the aforementioned Cresswell patents, as well as in the prior art patents hereinbefore acknowledged. Compositions containing, for example, from 3 to 50% by weight of 2-p-dioxanone or a linear polymer thereof and the remainder an acrylonitrile polymer or copolymer of the kind described above can be molded under heat and pressure to provide a wide variety of shaped, plasticized acrylonitrile polymerization products.

Although not limited thereto, the compositions of this invention are particularly useful in the production of filaments, threads, yarns, etc., which thereafter are woven into fabrics, and also as capacitor dielectrics and in other applications of dielectrics. Other uses include those given in the aforementioned patents.

The term "filament" as used generically herein and in one of the appended claims is intended to include within its meaning both monofilaments and multifilaments.

I claim:

1. A composition of matter comprising (1) a polymerization product containing in the polymer molecules an average of at least 80% by weight of combined acrylonitrile and (2) 2-p-dioxanone.

2. A composition as in claim 1 wherein the polymerization product is homopolymeric acrylonitrile.

3. A composition as in claim 1 wherein the polymerization product of (1) has an average molecular weight within the range of 15,000 to 300,000.

4. A composition as in claim 1 wherein the polymerization product of (1) constitutes at least 5% by weight of the composition.

5. A combination adapted for the production of films, filaments, threads, rods, tubes and the like comprising 2-p-dioxanone having dissolved therein a polymerization product containing in the polymer molecules an average of at least 80% by weight of combined acrylonitrile, said polymerization product constituting from about 5% to about 25%, by weight, of the total amount of polymerization product and 2-p-dioxanone.

6. A plasticized composition comprising a polymerization product containing in the polymer molecules an average of at least 80% by weight of combined acrylonitrile, said polymerization product being plasticized with a plasticizing amount not substantially exceeding 40% by weight of the composition of a plasticizer comprising 2-p-dioxanone.

7. A composition comprising a plasticized polymerization product containing in the polymer molecules an average of at least 80% by weight of combined acrylonitrile, said polymerization product being plasticized with from about 1% to about 35% by weight of the whole of 2-p-dioxanone.

8. A composition as in claim 7 wherein the polymerization product is homopolymeric acrylonitrile.

9. A filament which shows orientation along the fiber axis and which comprises a polymerization product containing in the polymer molecules an average of at least 80% by weight of acrylonitrile, said polymerization product being plasticized with from about 1% to about 20% by weight of the whole of 2-p-dioxanone.

JOHN J. PADBURY.

No references cited.